United States Patent
Nagatani

(10) Patent No.: US 8,199,345 B2
(45) Date of Patent: Jun. 12, 2012

(54) METHOD FOR CONTROLLING PRINTING APPARATUS AND METHOD FOR CONTROLLING IMAGE PROCESSING APPARATUS CONNECTED TO PRINTING APPARATUS

(75) Inventor: Masahiro Nagatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1090 days.

(21) Appl. No.: 12/105,900

(22) Filed: Apr. 18, 2008

(65) Prior Publication Data

US 2008/0304089 A1 Dec. 11, 2008

(30) Foreign Application Priority Data

Apr. 27, 2007 (JP) ................. 2007-118636

(51) Int. Cl.
*G06F 3/12* (2006.01)

(52) U.S. Cl. ...... 358/1.15; 358/1.1; 358/1.16; 358/1.14; 713/156

(58) Field of Classification Search ............ 358/1.1, 358/1.15, 1.16, 1.14; 713/156
See application file for complete search history.

(56) References Cited

U.S. PATENT DOCUMENTS

| 2001/0017714 | A1* | 8/2001 | Komatsu et al. | 358/1.16 |
| 2001/0056449 | A1* | 12/2001 | Kawamoto et al. | 707/527 |
| 2002/0184324 | A1* | 12/2002 | Carlin et al. | 709/206 |
| 2004/0057752 | A1* | 3/2004 | Owen et al. | 399/228 |
| 2004/0138964 | A1* | 7/2004 | Okada et al. | 705/27 |
| 2007/0266237 | A1* | 11/2007 | Kuroki | 713/156 |

FOREIGN PATENT DOCUMENTS

| JP | 2002-014797 A | 1/2002 |
| JP | 2003-029942 A | 1/2003 |
| JP | 2003-136813 A | 5/2003 |

* cited by examiner

*Primary Examiner* — Benny Q Tieu
*Assistant Examiner* — Martin Mushambo
(74) *Attorney, Agent, or Firm* — Canon USA, Inc., IP Division

(57) ABSTRACT

A method for controlling an information processing apparatus connected to a printing apparatus including a storage device includes acquiring a status of the printing apparatus; generating a first print file from image data in accordance with the status of the printing apparatus; transmitting the first print file to the printing apparatus; generating and transmitting an instruction to the printing apparatus to perform printing using the first print file; generating a second print file from the image data in accordance with a status that is different from the status of the printing apparatus; transmitting the second print file to the printing apparatus; and generating and transmitting an instruction to the printing apparatus to store the first and second print files in the storage device thereof.

13 Claims, 10 Drawing Sheets

CR1

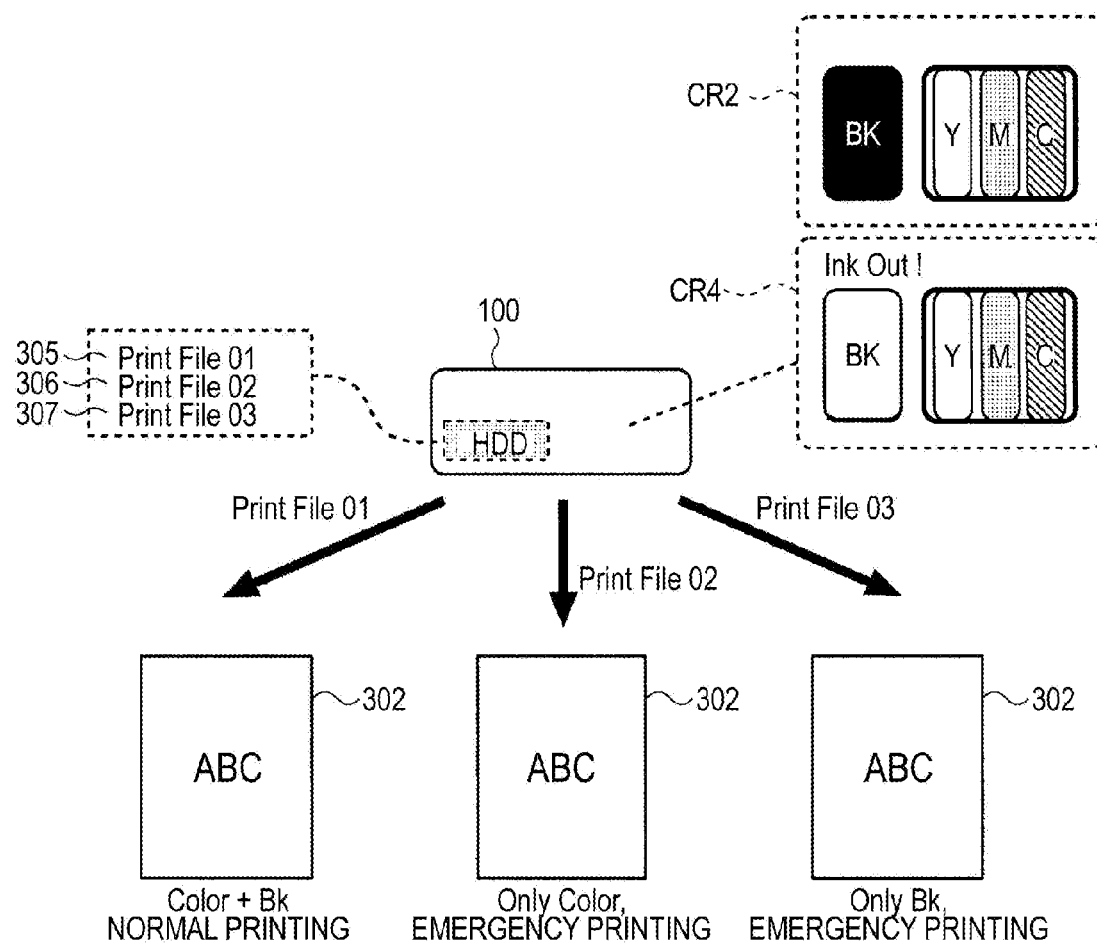

METHOD FOR CONTROLLING PRINTING APPARATUS AND METHOD FOR CONTROLLING IMAGE PROCESSING APPARATUS CONNECTED TO PRINTING APPARATUS

BACKGROUND OF THE INVENTION

1. Field of the Invention

The present invention relates to an image processing apparatus and an image processing method for directly storing a print file or the like in a hard disk drive (HDD) provided in a printer or an image input and output device of a multifunction peripheral (MFP), such as a printer having a copy function and a scanner function.

More particularly, the present invention relates to an image processing apparatus and an image processing method for directly storing a scan image input by an image input unit, a print file printed by an image output unit, a print file transmitted through, for example, PictBridge® to the image output unit, a print file received from a medium, and the like.

2. Description of the Related Art

In general, in the case of printing data included in a Web page that has been printed before, it is necessary to start a personal computer (PC) and display the intended Web page. Thus, it takes a large amount of time to print the data. In addition, in a case where the Web page has been updated or the Web page does not exist any more, repeat printing becomes impossible. Moreover, in a case where image correction and printing are performed using application software, a printer driver, or the like, it is difficult to reproduce the settings.

In the case of an inexpensive inkjet MFP, for example, a PC performs image processing to obtain data comprehensible by the MFP, and the PC transmits the obtained print data to the MFP.

In a case where printing is performed only by an MFP, the MFP directly converts an image file in a joint photographic experts group (JPEG) format or the like into data that can be comprehended by the MFP and then performs printing. In recent years, HDDs have been very inexpensive and have been provided in hard disk/digital versatile disc (HD/DVD) recorders, cellular phones, or music playing devices.

Thus, an MFP provided with an HDD can be used not only for storing an image taken or scanned and read by a digital camera but also for storing an image-processed print file that has been printed before and using the print file again to print the image. Moreover, such an MFP can store and organize input image files and search for a desired file.

Various MFPs have insertion slots into which various media, such as CompactFlash®, an SD card, and the like, are to be inserted. A user of an MFP designates, on an operation panel of the MFP, an image stored in a medium and performs desired print settings while looking at a liquid crystal screen of the MFP. Then, print processing is performed. The same applies to a case where copying is performed only by the MFP.

In contrast, in the case of storing a print file, a Windows® printer driver or the like assigns a print port for the print file and the print file is stored in a PC.

Regarding HDDs provided in expensive copying machines, a technology in which a PostScript file from a PC is stored in an HDD and in which a copying machine performs image processing at high speed and then performs printing has been known. In addition, a technology for causing such a PostScript file to be maintained in the HDD so that repeat printing can be performed has been available.

As described in Japanese Patent Laid-Open No. 2002-014797, a technology for performing a plurality of types of finishing on a single piece of print data so that two types of printing (1-up printing and N-up printing) can be performed has been known.

In addition, as described in Japanese Patent Laid-Open No. 2003-029942, a technology for processing a single piece of print data using a plurality of media so that two types of printing (overhead-projector (OHP) printing and normal-paper printing) can be performed has been known.

In the case of an HDD provided in an expensive copying machine, a PostScript file from a PC may be stored in the HDD, and repeat printing may be performed using the PostScript file stored in the HDD. Now, application of this method to an inkjet MFP or the like that does not have a function of converting a PostScript file into a print file that can be printed will be considered.

In order to print an input image in a JPEG format or the like stored in an HDD provided in an MFP, the input image is converted into RGB 8-bit data, and the RGB 8-bit data is color-converted into CMYK 8-bit data. The CMYK 8-bit data is quantized (including error diffusion and dithering) into CMYK 1-bit data. It is necessary to perform compression processing and add a command regarding printing to the compressed CMYK 1-bit data.

In a case where the above-described image processing is performed by an MFP itself, which performs the processing slowly compared with an expensive copying machine, it takes a longer time to complete the image processing and printing cannot thus be performed quickly.

Although data immediately previous to becoming a print file (that is, non-compressed RGB 8-bit data) may be stored in an HDD of an MFP, storing such data causes an increase in the amount of stored data.

As described above, storing a generated print file in an HDD of an MFP so that repeat printing can be performed achieves increases in speed and operability. However, in a case where print file generation data supports only a particular print condition, a desired print result may not be achieved. Furthermore, repeat printing itself may not be performed.

For example, in the case of performing printing and then generating a print file, if printing is performed only using color (CMY) ink as a countermeasure for an emergency, such as shortage of black ink, even when a cartridge of black ink is loaded into the MFP and repeat printing is performed, printing is performed only using color (CMY) ink. In this case, character strings in a document or the like are not formed of black ink but are formed of superimposition of CMY ink. Thus, printing quality is deteriorated, and ink consumption is increased.

In addition, in the case of shortage of a high-quality medium, such as professional photo paper, if a user wants to perform provisional printing using normal paper and then to perform printing using professional photo paper, the user needs to restart a PC to perform driver settings appropriate for professional photo paper so that printing using professional photo paper can be performed.

If a user has an inkjet postcard, an inkjet glossy postcard, a professional photo postcard, a photo glossy postcard, or a high-grade coated postcard, a print file is stored in an HDD of an MFP. However, if, after that, the user recognizes that the user does not have an inkjet postcard, an inkjet glossy postcard, a professional photo postcard, a photo glossy postcard, or a high-grade coated postcard, the user needs to restart a PC to perform driver settings appropriate for a normal postcard so that printing using a normal postcard can be performed.

In both the technologies described in Japanese Patent Laid-Open Nos. 2002-014797 and 2003-029942, a print file is not stored in an HDD and two types of printing are performed in accordance with a single print command. Thus, repeat printing only by an MFP cannot be performed.

SUMMARY OF THE INVENTION

An embodiment of the present invention provides an image processing apparatus that is capable of achieving print processing at high speed in the case of performing repeat printing only by the image processing apparatus, achieving outputting both in initial printing and repeat printing even in the case of shortage of a desired medium or desired ink, and achieving a print result with a high image quality in a case where all the conditions are satisfied.

According to an aspect of the present invention, a method is provided for controlling an information processing apparatus connected to a printing apparatus including a storage device. The method includes acquiring a status of the printing apparatus; generating a first print file from image data in accordance with the status of the printing apparatus; transmitting the first print file to the printing apparatus; generating and transmitting an instruction the printing apparatus to perform printing using the first print file; generating a second print file from the image data in accordance with a status that is different from the status of the printing apparatus; transmitting the second print file to the printing apparatus; and generating and transmitting an instruction to the printing apparatus to store the first and second print files in the storage device of the printing apparatus.

According to another aspect of the present invention, a method is provided for controlling a printing apparatus including a storage device, the printing apparatus being connected to an information processing apparatus. The method includes notifying the information processing apparatus of a status of the printing apparatus; receiving from the information processing apparatus a first print file generated from image data in accordance with the status of the printing apparatus; performing printing using the first print file; receiving from the information processing apparatus a second print file generated from the image data in accordance with a status that is different from the status of the printing apparatus; and storing the first and second print files in association with each other in the storage device.

According to an embodiment of the present invention, the method may further include displaying an image of the first and second print files, the image being represented by a display file stored in the storage device in association with the first and second print files; designating a selected image from among displayed images; and performing printing using a print file stored in association with a display file of the designated image, the print file corresponding to the status of the printing apparatus.

Further features of the present invention will become apparent from the following description of exemplary embodiments with reference to the attached drawings.

BRIEF DESCRIPTION OF THE DRAWINGS

FIG. 3C is a system configuration diagram showing the data conversion system including the MFP.

DESCRIPTION OF THE EMBODIMENTS

First Embodiment

Figure 1:
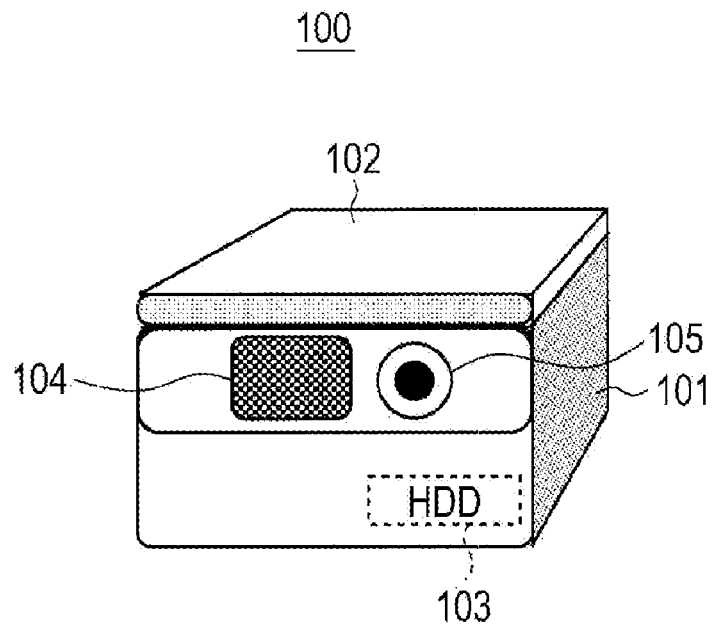
FIG. 1 is an explanatory illustration showing an MFP according to a first embodiment of the present invention.

FIG. 1 is an explanatory illustration showing an MFP 100 according to a first embodiment of the present invention.

The MFP 100 is an example of an input and output apparatus or an example of an image processing apparatus. The MFP 100 includes a printer unit 101, a scanner unit 102, a storage device 103, an image display unit 104, and an operation unit 105.

The printer unit 101 performs color printing on a print sheet using four colors (yellow (Y), magenta (M), cyan (C), and black (B)) of ink. However, some color printers may use a print cartridge having an increased number of nozzles so as to achieve high-speed monochrome printing or may use a high-capacity black ink cartridge providing a large amount of black ink so as to increase the number of printable pages.

Figure 2:
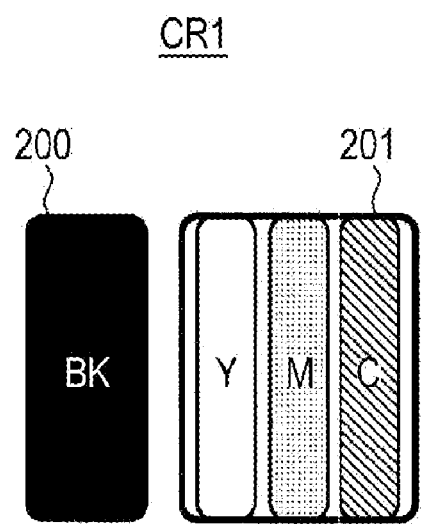
FIG. 2 illustrates a cartridge group provided in the MFP.

FIG. 2 illustrates a cartridge group CR1 provided in the MFP 100.

The cartridge group CR1 represents a printer including a black cartridge 200 and a cartridge 201 of three-color (cyan, magenta, and yellow) integrated type.

The scanner unit 102 is a flat-bed-type color image scanner and is provided, for example, above the printer unit 101.

The storage device 103 is a high-capacity HDD. The storage device 103 has a capacity of, for example, several tens of gigabytes to five hundred gigabytes so that images scanned by the MFP 100, copied scanned images or print files, and print files acquired from a PC 301 can be stored in the storage device 103.

The image display unit 104 displays image data stored in the HDD. The image display unit 104 is capable of displaying character information of additional information (the date, the name of a file, and the like) contained in data stored in the HDD, so that an image that a user wants to view or an image that the user wants to print can be easily searched for and selected.

The operation unit 105 is operated for the purpose of copying or scanning. The user uses the operation unit 105 when searching for and selecting a file in the MFP 100.

Figure 3A:
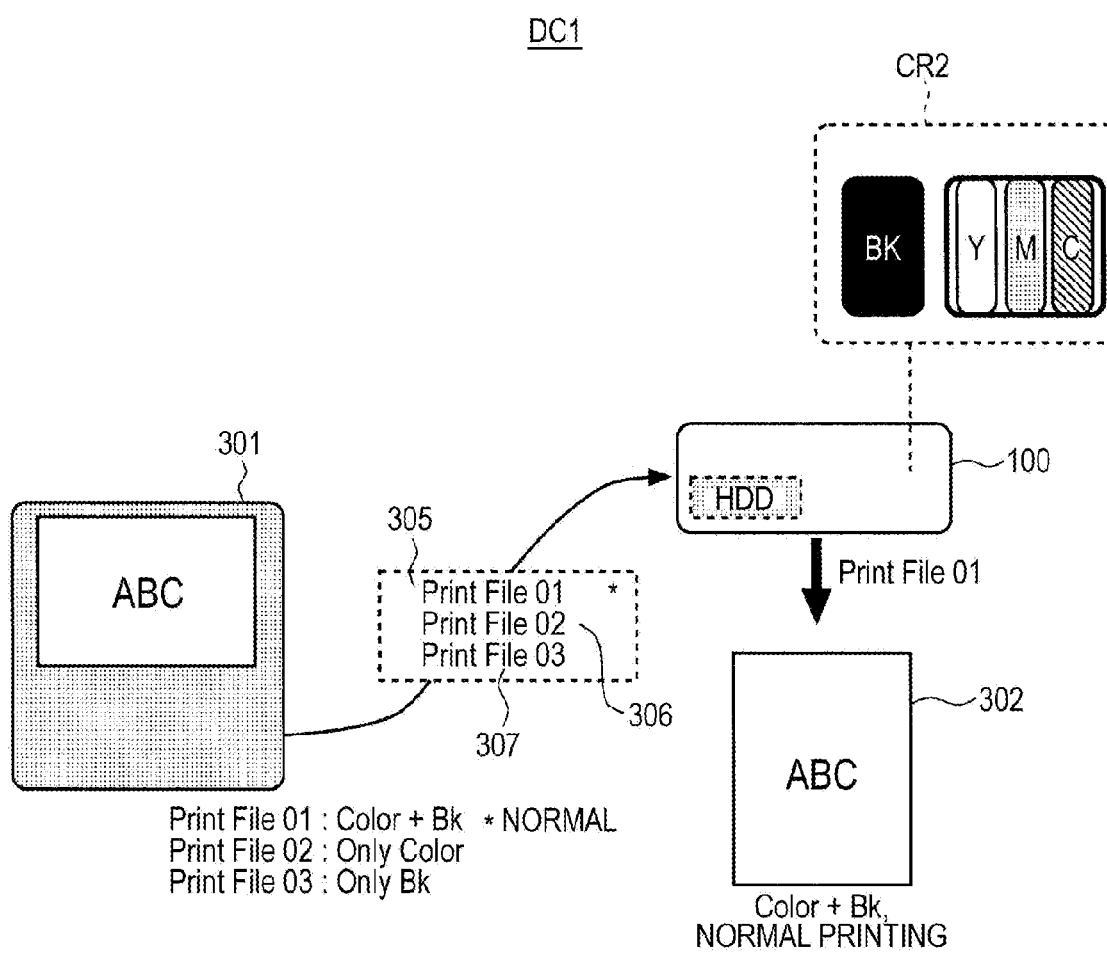
FIG. 3A is a system configuration diagram showing a data conversion system including the MFP.
Figure 3B:
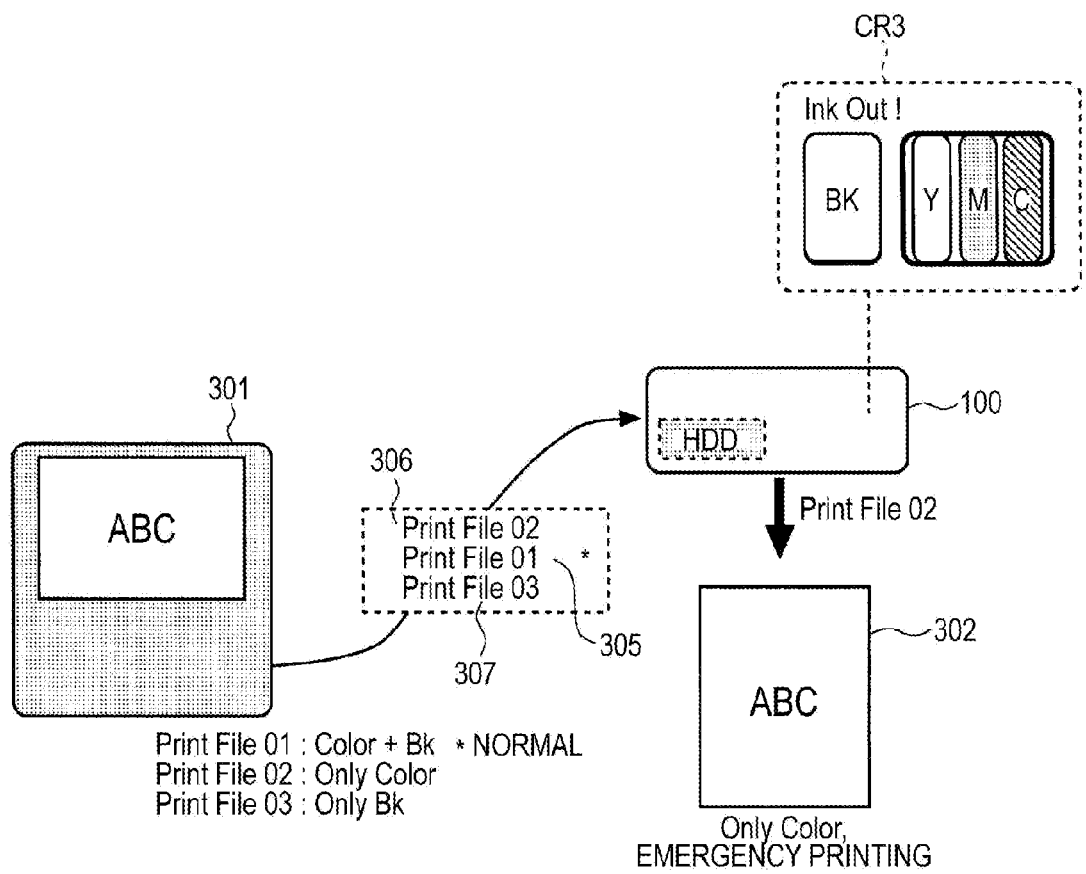
FIG. 3B is a system configuration diagram showing the data conversion system including the MFP.

FIGS. 3A to 3C are system configuration diagrams each showing a data conversion system DC1 including the MFP 100.

The data conversion system DC1 includes the PC 301, the MFP 100, a record medium 302, and a cartridge group CR2.

The PC 301 is an example of a control apparatus. The PC 301 performs data processing regarding the data conversion system DC1 and performs operation control of mechanical elements of various units.

A storage device (not shown) is, for example, a memory, such as a read-only memory (ROM) or a random-access memory (RAM), a hard disk, or an optical disk.

The record medium 302 is a medium on which printing is performed by the MFP 100. The record medium 302 is, for example, normal paper, glossy paper, a postcard, or an OHP sheet.

An operation to be performed in the first embodiment will be described.

A case where printing is performed by the MFP 100 in response to an instruction from the PC 301 and a print file is stored in an HDD provided in the MFP 100 will be described.

A user selects, on the PC 301, an image file, a Web page, or the like that the user wants to print. Application software on the PC 301 starts a printer driver, and printing is performed.

Figure 4:
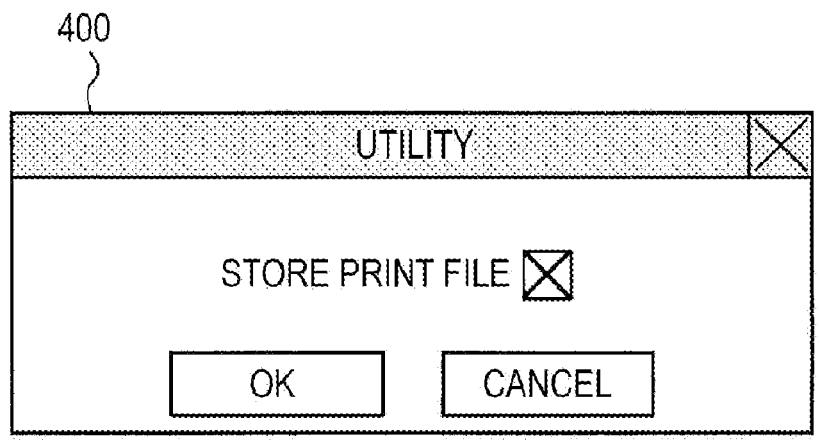
FIG. 4 illustrates a utility setting screen of a printer driver for setting regarding storage of a print file.

FIG. 4 illustrates a setting screen 400, which is a utility screen of the printer driver, for setting regarding storage of a print file.

Concerning user interface settings of the printer driver, selection of whether a print file is to be stored in the MFP 100 can be performed on the utility setting screen 400 or the like, as shown in FIG. 4.

In a case where the user desires printing based on the setting "store" and selects normal paper, the printer driver communicates with the MFP 100 to acquire cartridge information and the remaining ink amount. As shown in FIG. 3A, in the case that the remaining ink amount is sufficient (in the case of the status of the cartridge group CR2), setting for using the black cartridge and the color cartridge is performed. Then, a print file 305 (Print File 01) is generated, and the generated print file 305 is transmitted to the MFP 100. Actual printing is performed, and at the same time, the print file 305 is stored in the HDD.

Then, in accordance with setting for using only the color cartridge, a print file 306 (Print File 02) is generated in the PC 301, and the generated print file 306 is transferred to the MFP 100. In addition, in accordance with setting for using only the black cartridge, a print file 307 (Print File 03) is generated in the PC 301, and the generated print file 307 is transferred to the MFP 100.

Figure 5:
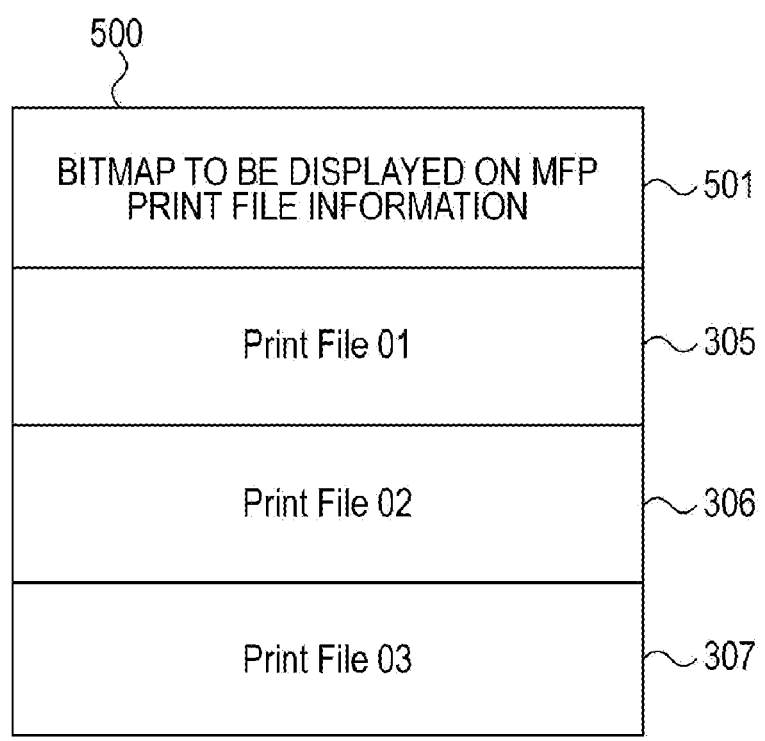
FIG. 5 illustrates a diagram of an integrated file including a plurality of print files added together.

FIG. 5 illustrates a diagram of an integrated file 500 including a plurality of print files added together.

Then, the Print File 01, the Print File 02, and the Print File 03 are added together to form the integrated file 500. As shown in FIG. 5, a bitmap file having a size that is capable of displaying an image stored in the MFP 100 and print file information 501 acquired when the print files are generated are added to the Print File 01, the Print File 02, and the Print File 03 to form the integrated file 500.

The "print file information" is information to be added by the user by utilizing application software. For example, the print file information includes information on the contents of an image, such as person/group information, place information, and category (purpose) information, input apparatus information, and printer driver information (including the type and size of a medium). Information on the type and size of a medium and a paper feed method, which can be determined from driver information, can be acquired from command information of a print file.

Figure 6A:
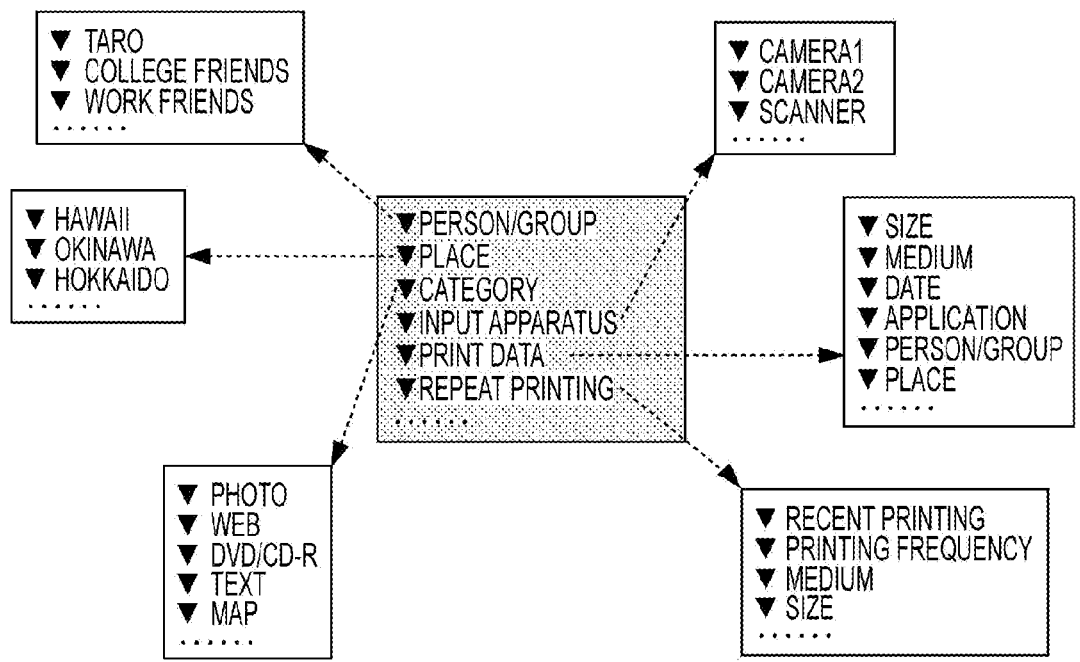
FIG. 6A illustrates a diagram representing a panel display portion of the MFP on which images or print files are displayed so that a user is able to designate a desired image or print file.

FIG. 6A illustrates a diagram representing a panel display portion of the MFP 100 on which images or print files are displayed so that a user is able to designate a desired image or print file.

Figure 6B:
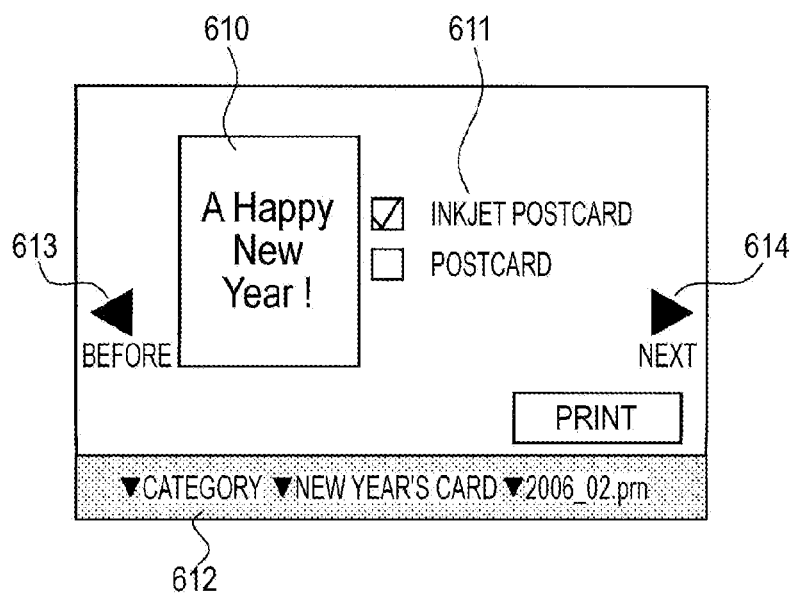
FIG. 6B illustrates a diagram representing the panel display portion of the MFP on which a desired image or print file is displayed as a preview image.

FIG. 6B illustrates a diagram representing the panel display portion of the MFP 100 on which a desired image or print file is displayed as a preview image.

In accordance with the above-described information, as shown in FIGS. 6A and 6B, a desired piece of data is searched for on the display screen of the MFP 100. Scan data or data taken by a digital camera, as well as a print file, can be stored.

In the case that the remaining amount of black ink is not sufficient (in the case of the status of a cartridge group CR3), which is an emergency, as shown in FIG. 3B, the processing described below is performed. First, setting for not using black ink (that is, setting for using only the color cartridge) is performed. Then, a print file 306 (Print File 02) is generated in the PC 301, and the generated print file 306 is transmitted to the MFP 100. Actual printing is performed, and at the same time, the print file 306 (Print File 02) is stored in the HDD.

Then, a print file 305 (Print File 01) based on setting for using the black cartridge and the color cartridge is generated, and the generated print file 305 is transferred to the MFP 100. Then, in accordance with setting for using only the black cartridge, a print file 307 (Print File 03) is generated in the PC 301, and the generated print file 307 is transferred to the MFP 100.

Figure 10:
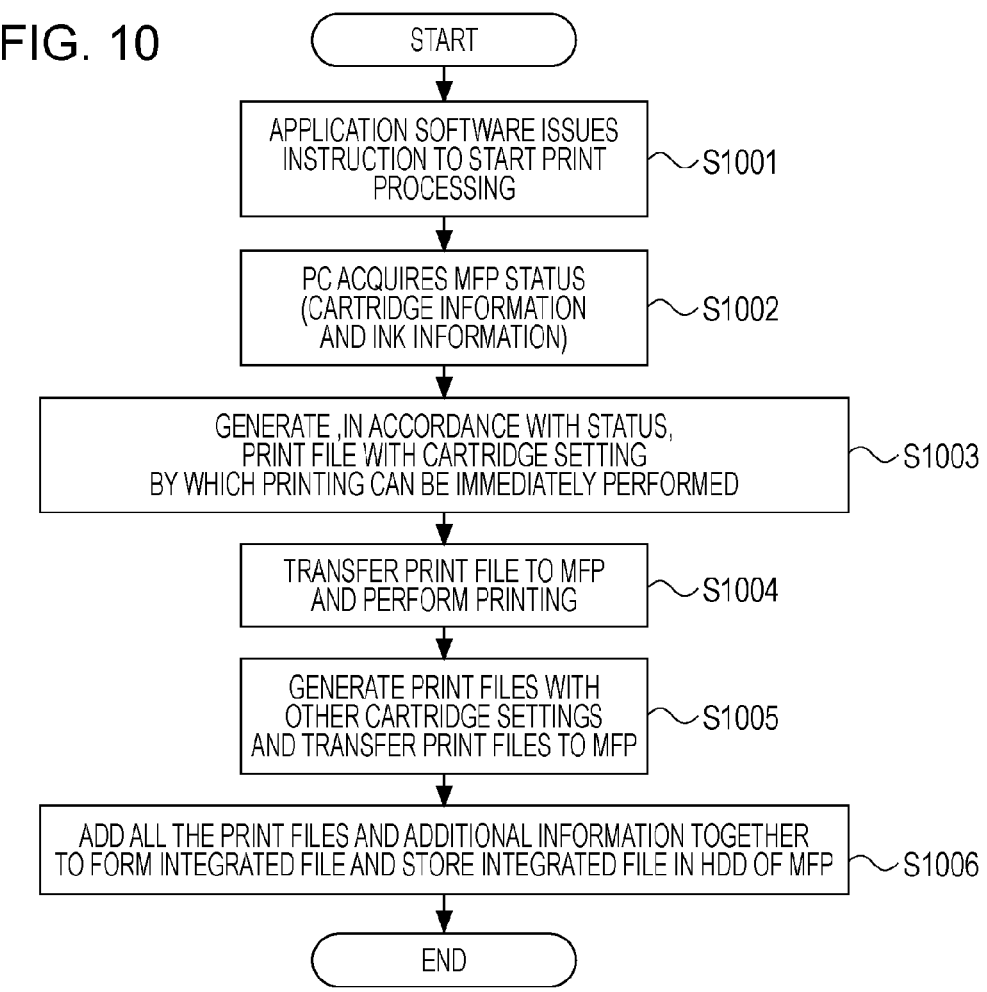
FIG. 10 is a flowchart showing an operation to be performed in the first embodiment.

FIG. 10 is a flowchart showing an operation to be performed in the first embodiment.

Application software issues an instruction to start print processing (step S1001), and the PC 301 acquires the status (cartridge information and ink information) of the MFP 100 (step S1002). In accordance with the acquired status, the PC 301 generates a print file in accordance with cartridge setting by which printing can be performed immediately (step S1003). The PC 301 transfers the generated print file to the MFP 100, and printing is performed (step S1004). The PC 301 generates print files in accordance with other cartridge settings, and transfers the generated print files to the MFP 100 (step S1005). Then, all the print files and additional information are added together to form an integrated file, and the integrated file is stored in the HDD of the MFP 100 (step S1006).

A print file stored here is a file obtained by color-converting RGB 8-bit data into CMYK 8-bit data using a color conversion module and then quantizing (including error diffusion and dithering) the CMYK 8-bit data into CMYK 1-bit data or the like in a printer driver. Then, compression processing is performed and a command regarding printing is added to the compressed CMYK 1-bit data.

An operation of the MFP 100 for directly performing repeat printing without starting the PC 301 in the first embodiment will be described with reference to FIG. 3C.

In the case that the remaining ink amount is sufficient (in the case of the status of the cartridge group CR2), a bitmap of a print file to be printed, which is in association with the stored print file, is displayed on the image display unit 104 of the MFP 100. The user selects image data to be printed and issues an instruction to perform print processing. Then, the MFP 100 detects cartridge information and the remaining ink amount (the status of the cartridge group CR2). In this case, since the remaining amounts of black ink and color ink are sufficient, the print file 305 (Print File 01) is acquired from the HDD provided in the MFP 100, and printing is performed.

Accordingly, although the initial printing is performed using only the color cartridge, as shown in FIG. 3B, repeat printing is performed in accordance with setting for using the black cartridge and the color cartridge. Thus, the existing problem that "since character strings in a document or the like are not formed of black ink but are formed of superimposition of CMY ink, printing quality is deteriorated and ink consumption is increased" can be solved.

In the case of shortage of black ink (in the case of the status of a cartridge group CR4) or in the case that a black cartridge is not installed, printing is performed in accordance with a print file 306 (Print File 02). In the case of shortage of color ink or in the case that a color cartridge is not installed, printing is performed in accordance with a print file 307 (Print File 03). Thus, although the initial printing is performed in accordance with setting for using the black cartridge and the color cartridge, as shown in FIG. 3A, repeat printing is performed in accordance with setting for using the black cartridge or using the color cartridge.

Thus, the existing problem that "due to the shortage of ink, repeat printing itself cannot be performed" can be solved (steps S1101 to S1103).

Figure 11:
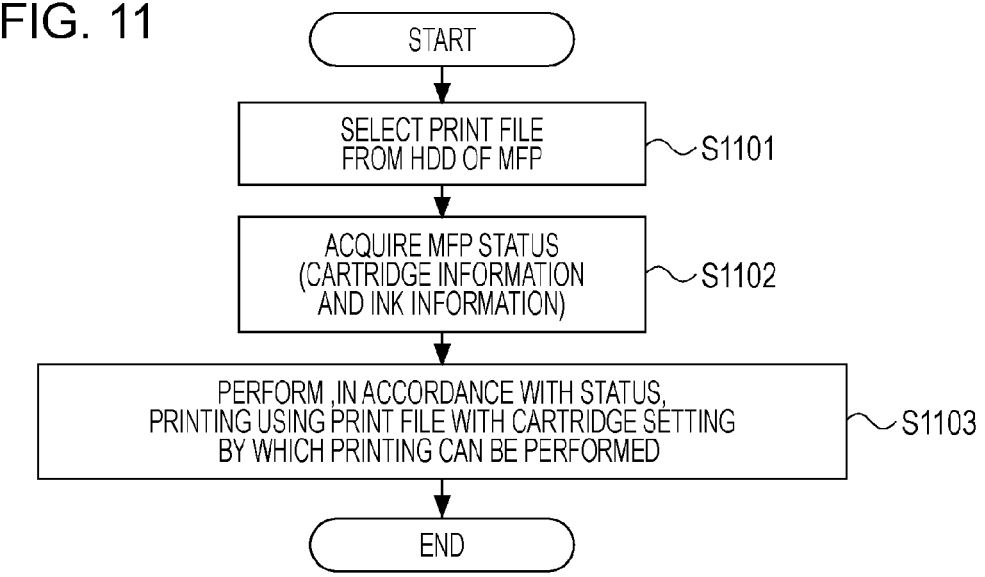
FIG. 11 is a flowchart showing an operation from selection of a print file to execution of repeat printing in the first embodiment.

FIG. 11 is a flowchart showing an operation from selection of a print file to execution of repeat printing in the first embodiment.

Second Embodiment

According to a second embodiment of the present invention, copy printing is performed by the MFP 100 and a print file is stored in the HDD provided in the MFP 100.

Figure 7A:
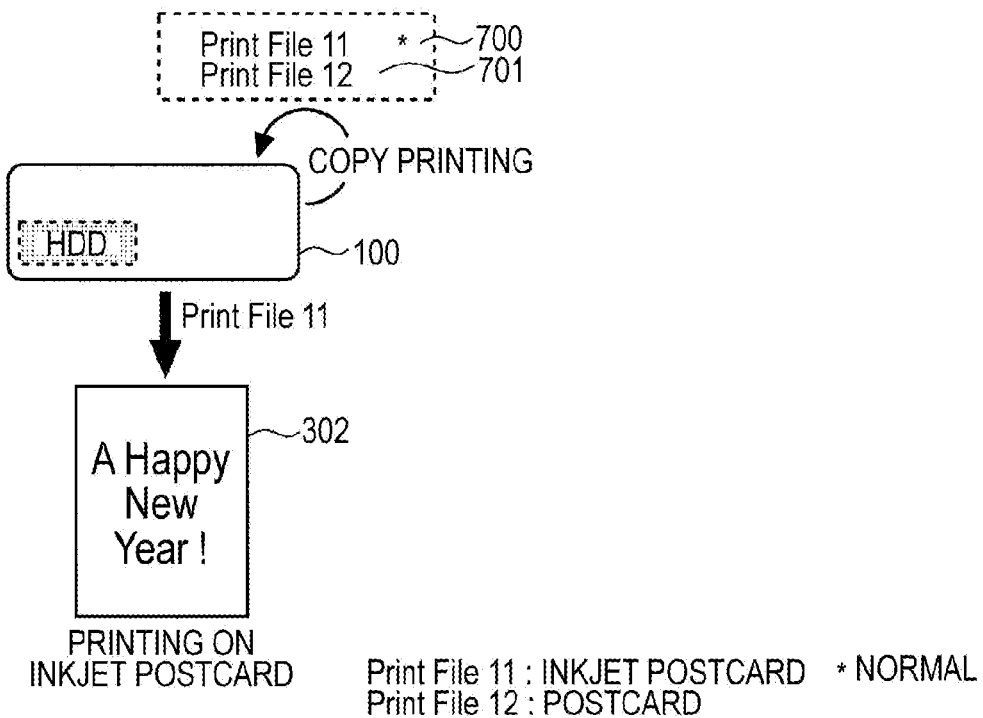
FIG. 7A illustrates a diagram of generation of a print file at the time of initial copy printing in a second embodiment.

FIG. 7A illustrates a diagram of generation of a print file at the time of initial copy printing in the second embodiment.

Figure 7B:
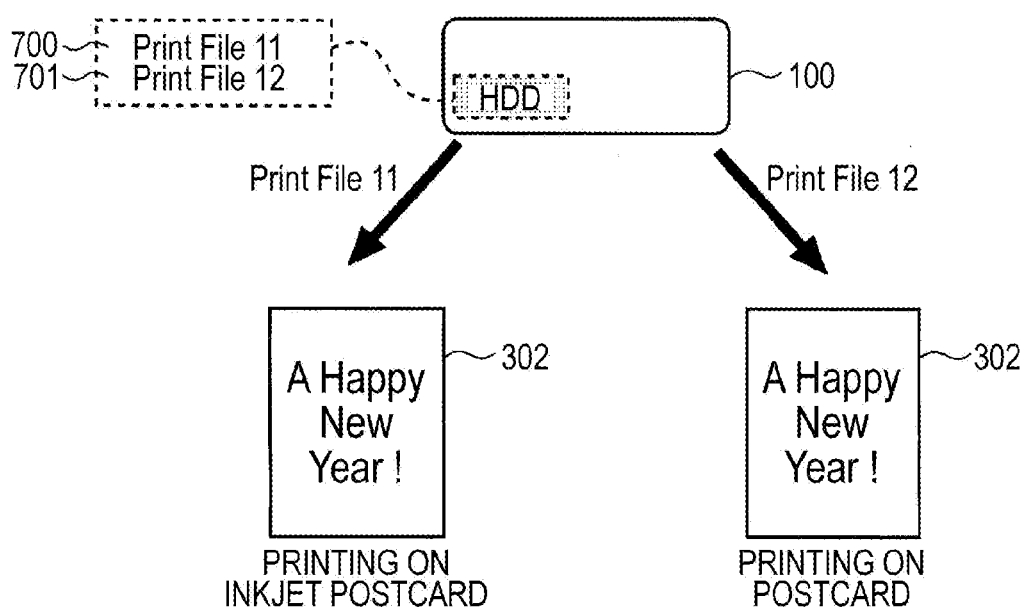
FIG. 7B illustrates a diagram of execution of repeat printing using an HDD provided in the MFP in the second embodiment.

FIG. 7B illustrates a diagram of execution of repeat printing using the HDD provided in the MFP 100 in the second embodiment.

Figure 8:
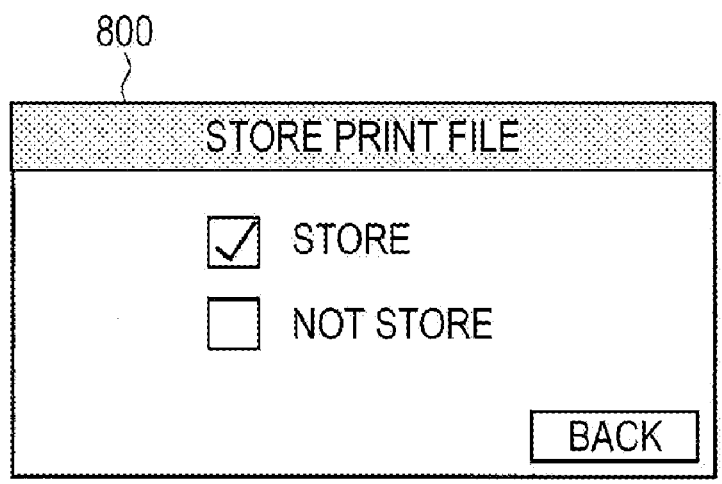
FIG. 8 illustrates a panel display of the MFP to be used for setting whether a print file is to be stored.

Original data to be copied is placed on an original plate of the MFP 100. The user selects, on the image display unit 104 of the MFP 100, a copy button in accordance with desired setting to issue an instruction to start print processing. Here, as shown in FIG. 8, concerning a screen 800 of user interface settings on the image display unit 104 of the MFP 100, the user is able to select whether a print file is to be stored in the MFP 100.

In a case where the user desires printing based on the setting "store" and selects an inkjet postcard, a print file based on setting for an inkjet postcard is generated. Actual printing is performed, and at the same time, the print file is stored in the HDD. The same applies to a case where an inkjet glossy postcard, a professional photo postcard, a photo glossy postcard, or a high-grade coated postcard is used, instead of an inkjet postcard.

If the type of a medium to be used by the user is a "professional photo postcard", which is not included in a menu, the user manually designates setting for "medium type: professional photo (and, medium size: postcard)". The emergency mode for such a combination is set to "medium type: postcard (and, medium size: postcard)".

Then, the MFP 100 generates a print file in accordance with postcard setting as the emergency mode for an inkjet postcard. The generated print file is stored in the HDD.

Figure 12:
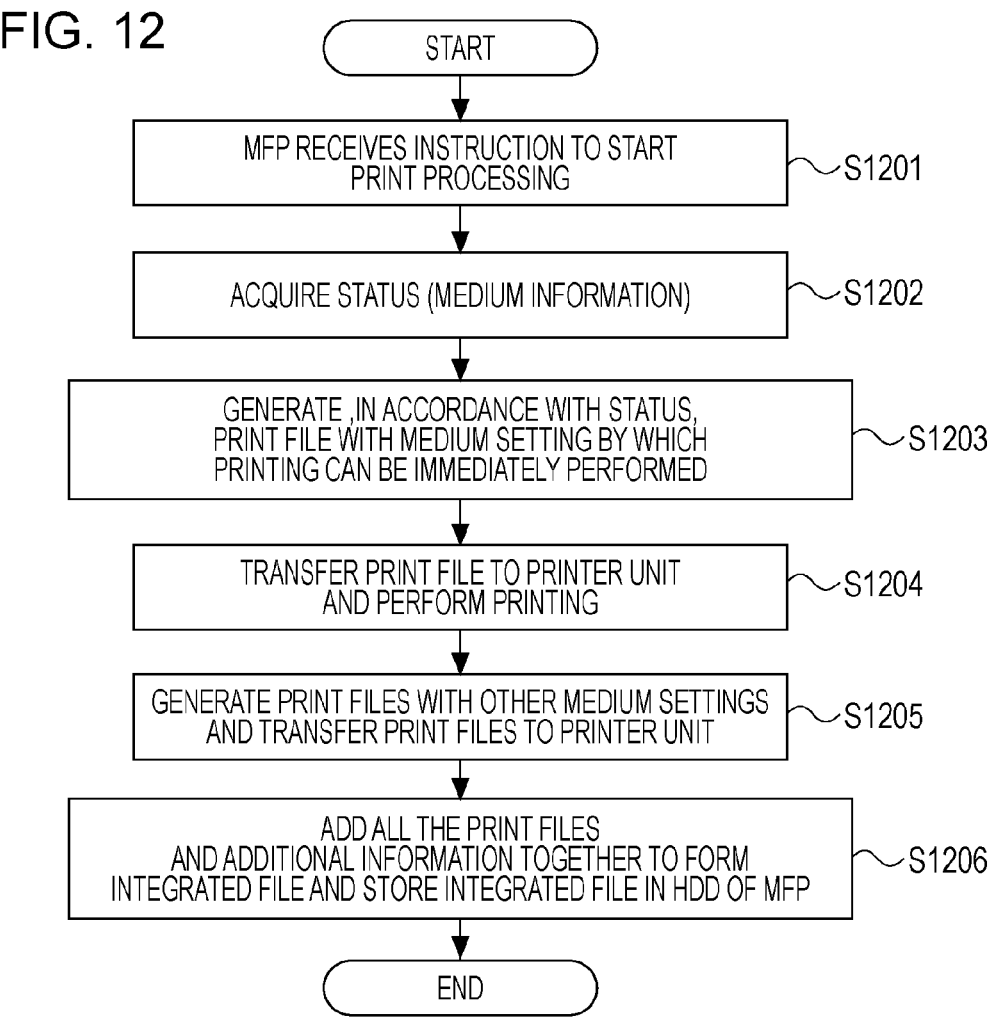
FIG. 12 is a flowchart showing an operation to be performed in the second embodiment.

FIG. 12 is a flowchart showing an operation to be performed in the second embodiment.

The MFP 100 receives an instruction from a user to start print processing (step S1201), and acquires a status (medium information) (step S1202). In accordance with the acquired status, the MFP 100 generates a print file in accordance with medium setting by which printing can be performed immediately (step S1203). The MFP 100 transfers the generated print file to the printer unit 101, and printing is performed (step S1204). The MFP 100 generates print files in accordance with other medium settings, and transfers the generated print files to the printer unit 101 (step S1205). Then, all the print files and additional information are added together to form an integrated file, and the integrated file is stored in the HDD of the MFP 100 (step S1206).

Data stored here is data obtained by color-converting RGB 8-bit data into CMYK 8-bit data and then quantizing (including error diffusion and dithering) the CMYK 8-bit data into CMYK 1-bit data or the like in the MFP 100. Then, compression processing is performed and a command regarding printing is added to the compressed CMYK 1-bit data.

A case where the MFP 100 directly performs repeat printing without starting the PC 301 will be described with reference to FIG. 7B.

The image display unit 104 of the MFP 100 displays associated file names of stored print files.

As shown in FIG. 6A, a user interface screen is displayed on the image display unit 104. The user searches for and selects the name of a print file to be printed, and issues an instruction to perform printing. In a case where a preview image is displayed, as shown in FIG. 6B, a preview image 610 is displayed, a medium selection button 611 is provided, and print file information (a file path) 612 is displayed. In a case where a print file contains a plurality of pieces of information, a plurality of pieces of print file information may be displayed. In addition, a before button 613 and a next button 614 are provided so that the user is able to designate an image previous to and subsequent to the image being displayed.

Figure 9:
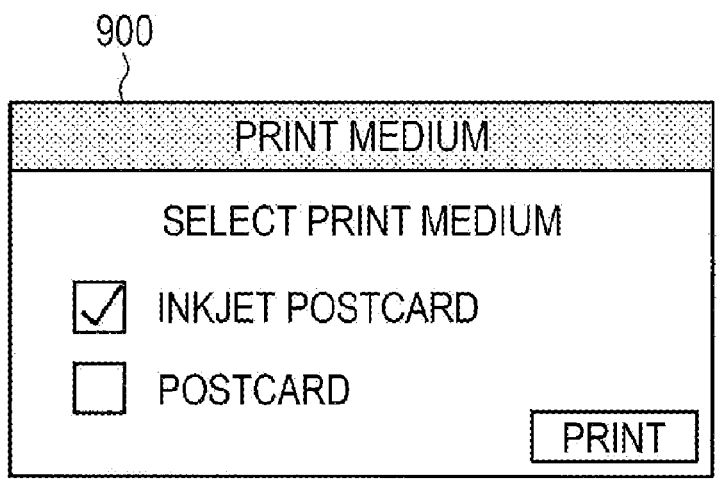
FIG. 9 illustrates a guide screen relating to a medium on which printing is to be performed by the MFP at the time of repeat printing in the second embodiment.

Before performance of printing, the type of a medium is detected and medium type information is acquired. If medium type information is not acquired, the MFP 100 displays a message 900 on the image display unit 104, as shown in FIG. 9. The user is urged to select an inkjet postcard or a postcard and then to issue an instruction to perform printing. If the type of a medium is not included in a menu, information, such as "medium type: professional photo, medium size: postcard" or "medium type: postcard, medium size: postcard", may be displayed.

Then, if an inkjet postcard is designated, a print file 700 (Print File 11) for an inkjet postcard is acquired from the HDD provided in the MFP 100, and printing is performed.

If a postcard is designated, a print file 701 (Print File 12) for a postcard is acquired from the HDD provided in the MFP 100, and printing is performed (steps S1301 to S1303).

Figure 13:
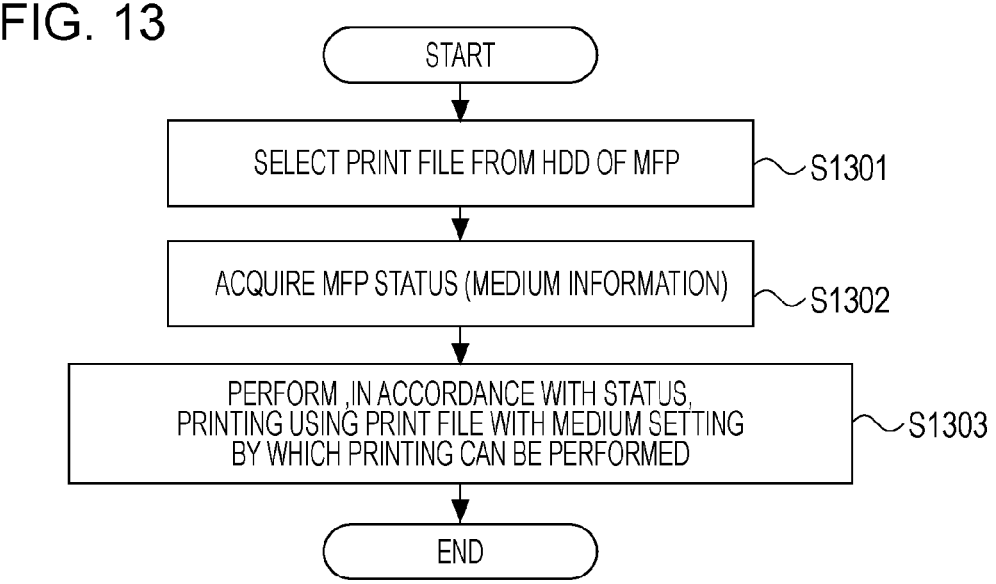
FIG. 13 is a flowchart showing an operation from selection of a print file to execution of repeat printing in the second embodiment.

FIG. 13 is a flowchart showing an operation from selection of a print file to execution of repeat printing in the second embodiment.

Concerning normal printing and emergency printing, the following combinations may be available: framed printing/frameless printing, 2L-size printing/L-size printing, duplex printing/single-sided printing, silent printing on/off, grayscale printing of/off, and automatic sheet feeder/paper feed cassette.

In addition, in accordance with the type of medium, conditions for normal printing can differ from conditions for emergency printing. For example, in the case of normal paper, conditions regarding cartridges (color and black, only color, or only black) can be set. In the case of a postcard, conditions regarding framed/frameless printing can be set.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-118636 filed Apr. 27, 2007, which is hereby incorporated by reference herein in its entirety.

What is claimed is:

1. A method for controlling an information processing apparatus connected to a printing apparatus including a storage device, the method comprising:
    acquiring a status of the printing apparatus;
    generating a first print file which is in printable condition at the status of the printing apparatus from image data;
    transmitting the first print file to the printing apparatus;
    generating and transmitting a first instruction to the printing apparatus to perform printing using the first print file;
    generating a second print file which is other than the first print file and is at least one print file from a plurality of predetermined print files, wherein the second print file is generated from the image data after generating and transmitting the first instruction and is generated regardless of the printable or non-printable condition at the status of the printing apparatus;
    transmitting the second print file to the printing apparatus; and
    generating and transmitting a second instruction to the printing apparatus to store the first and second print files in the storage device of the printing apparatus.

2. The method according to claim 1, wherein the first and second print files are stored in association with each other in the storage device of the printing apparatus in response to the second instruction received from the information processing apparatus.

3. The method according to claim 2, wherein the association is made by adding the first and second print files together to form an integrated file.

4. The method according to claim 2, wherein a display file for displaying an image of the first and second print files is stored in association with the first and second print files.

5. The method according to claim 2, wherein file information to be used for searching for an image of the first and second print files is stored in association with the first and second print files.

6. The method according to claim 1, wherein the status of the printing apparatus includes a type of a record medium loaded in the printing apparatus.

7. The method according to claim 1, wherein the status of the printing apparatus includes information on an ink cartridge loaded in the printing apparatus.

8. The method according to claim 1, wherein the status of the printing apparatus includes an amount of remaining ink loaded in the printing apparatus.

9. A method for controlling a printing apparatus including a storage device, wherein the printing apparatus is connected to an information processing apparatus, the method comprising:
    notifying the information processing apparatus of a status of the printing apparatus;
    receiving from the information processing apparatus a first print file which is in printable condition at the status of the printing apparatus from image data;
    receiving from the information processing apparatus a first instruction to perform printing using the first print file and performing printing using the first print file;
    receiving from the information processing apparatus a second print file which is other than the first print file and is at least one print file from a plurality of predetermined print files, wherein the second print file is generated from the image data after generating and transmitting the first instruction and is generated regardless of the printable or non-printable condition at the status of the printing apparatus; and
    receiving from the information processing apparatus a second instruction to store the first and second print files in the storage device of the printing apparatus and storing the first and second print files in association with each other in the storage device.

10. The method according to claim 9, further comprising:
    displaying an image of the first and second print files, wherein the image is represented by a display file stored in the storage device in association with the first and second print files;
    designating a selected image from displayed images; and
    performing printing using a print file stored in association with a display file of the designated image, wherein the print file corresponds to the status of the printing apparatus.

11. The method according to claim 10,
    wherein file information of the first and second print files is stored in association with the first and second print files, and
    wherein a display file stored in association with a print file found in accordance with the file information is displayed.

12. A non-transitory computer-readable recording medium storing a program causing an information processing apparatus to execute the method according to claim 1.

13. A non-transitory computer-readable recording medium storing a program causing a printing apparatus to execute the method according to claim 9.

* * * * *